United States Patent [19]
Curwick et al.

[11] Patent Number: 5,909,535
[45] Date of Patent: Jun. 1, 1999

[54] HOT AIR WELDING TORCH WITH CONCENTRIC TUBULAR MEMBERS PROVIDING COOLING AIR FLOW

[75] Inventors: Donald L. Curwick, Farmington; Dominick P. DiChiria, Wayzata, both of Minn.

[73] Assignee: Seelye Acquisition, Inc., Ocoee, Fla.

[21] Appl. No.: 09/065,632

[22] Filed: Apr. 23, 1998

[51] Int. Cl.⁶ ................................................... B05B 1/24
[52] U.S. Cl. .......................... 392/476; 392/473; 392/478; 219/230
[58] Field of Search .................................. 392/476, 379, 392/380, 383–385; 156/579; 607/104–107; 433/32; 219/230, 227, 229; 228/20.5

[56] References Cited

U.S. PATENT DOCUMENTS

| | | | |
|---|---|---|---|
| 1,006,767 | 10/1911 | Mauger | 392/385 |
| 1,227,324 | 5/1917 | Russell et al. | |
| 2,042,264 | 5/1936 | Levenhagen | 392/384 |
| 2,859,327 | 11/1958 | Kaminsky | |
| 3,365,811 | 1/1968 | Djenner | 392/383 |
| 3,612,824 | 10/1971 | Berryman et al. | 392/383 |
| 3,668,370 | 6/1972 | Pattison | 392/385 |
| 4,551,615 | 11/1985 | Wilson | |
| 4,629,864 | 12/1986 | Wilson | |
| 4,788,413 | 11/1988 | Eng | 392/385 |
| 5,054,106 | 10/1991 | Fortune | 392/476 |
| 5,243,682 | 9/1993 | Eberts | 392/370 |
| 5,656,126 | 8/1997 | Martinez | |

FOREIGN PATENT DOCUMENTS

| | | | |
|---|---|---|---|
| 1254781 | 1/1961 | France | 392/383 |
| 2432957 | 1/1976 | Germany | 392/476 |
| 3518426 | 11/1986 | Germany | 392/385 |
| 400548 | 4/1966 | Switzerland | 392/476 |
| 1736411 | 5/1992 | U.S.S.R. | 392/383 |
| 2069834 | 9/1981 | United Kingdom | 392/385 |
| 8302753 | 8/1983 | WIPO | |

OTHER PUBLICATIONS

1973—Kamweld Products Co., Inc.—"Other Kamweld Products" (2 pages).
1973—Kamweld Products Co., Inc.—"Self–Contained 'Ready' Welder for Plastics" (6 pages).

*Primary Examiner*—Teresa Walberg
*Assistant Examiner*—Thor S. Campbell
*Attorney, Agent, or Firm*—Hugh D. Jaeger

[57] ABSTRACT

A hot air torch for the welding of plastic featuring an air flow around and about the inner portions of tubular members which entrains unwanted internally generated heat prior to the welding tip to provide a torch body which is safe to the touch while at the same time providing suitably heated air at the welding tip. Excess accumulated heat is vented overboard in the vicinity of the welding tip.

19 Claims, 9 Drawing Sheets

HOT AIR WELDING TORCH WITH CONCENTRIC TUBULAR MEMBERS PROVIDING COOLING AIR FLOW

BACKGROUND OF THE INVENTION

1. Field of the Invention

The present invention is for a welding torch, and more particularly, pertains to a hot air welding torch for the welding of plastic members which features a handle and an outer tube or barrel which is cool and safe to the touch. An internal airflow carries off heat normally found in a hot air welding torch and vents the excess heat overboard.

2. Description of the Prior Art

Prior art hot air welding torches have generally devised ingenious schemes and expedient methods to efficiently deliver hot air to a welding tip suitable for the welding of plastic, but have not addressed the subject of operator safety, especially safety pertaining to accidental touching of the torch in the tubular or barrel area connecting the handle with the welding tip.

The present invention provides a hot air welding torch having an internal air flow which carries away undesirable heat in the tubular or barrel region of the hot air welding torch.

SUMMARY OF THE INVENTION

The general purpose of the present invention is to provide a torch for welding of plastic which is efficient, compact, economical, includes a minimum of parts, and is safe to touch during use. The torch for welding of plastic is a portable, hand-held, hot air welding torch, which can be used with accompanying support devices, for heating and joining of thermoplastic parts.

According to one embodiment of the present invention, the torch comprises a handle having rearward and forward ends and an axially positioned air introduction tube having a rearward end protruding slightly beyond the rearward end of the handle; an inner tube for the passage of air having a rearward end connected to the forward end of the air introduction tube and a forward end to which a nozzle assembly having a plurality of air exit nozzles and a welding tip are affixed; an electrical resistance heater and surrounding housing located within the inner tube near the forward end thereof and just rearward of the nozzle assembly and welding tip for heating air flowing through the inner tube; an outer tube for the passage of air surrounding the inner tube in coaxial spaced relationship with respect thereto and affixed to the nozzle assembly; and a plurality of air passage holes extending through the wall of the inner tube near the central region thereof which form passageways for air to flow from the interior of the inner tube to the interior of the outer tube. In use, air emerges from the air introduction tube and passes immediately into the inner tube. Then the air follows two flow paths: (1) forwardly through the inner tube to the electrical resistance heater (which heats the air) and thence past the electrical resistance heater and out through the welding tip, and (2) radially through the plurality of air passage holes (whereat the air is unheated) into the space between the inner and outer tubes, which space constitutes an annular cooling chamber, and then forwardly through the outer tube to the air exit nozzles of the nozzle assembly wherefrom it is exhausted. Air flowing through the second air flow path picks up heat radiated from the inner tube and transports it to the nozzle assembly where it is expelled through the plurality of air exit nozzles of the nozzle assembly, thus maintaining the outer tube cool and safe to touch so that the operator will not be burned by touching the outer tube. The provision of this second air flow path constitutes the "main idea" of the invention and is regarded as the paramount point of novelty.

According to an alternate embodiment of the present invention, there is provided a hot air welding torch having increased airflow and cooling for use where very high temperatures are required for welding, such as when welding ultra high molecular weight (UHHW) plastics. The alternative embodiment differs from the first embodiment mainly in the inclusion of an intermediate tube between the inner and outer tubes, in the location of the cooling chamber, which is between the intermediate tube and the outer tube, and in the construction of the nozzle assembly. In this embodiment the pressurized air again follows two air flow paths. As in the first embodiment, one of these air flow paths is through the inner tube, past the electrical resistance heater, and out through the welding tip. The other air flow path, however, is from the inner tube to the cooling chamber between the intermediate tube and the outer tube, and then out through an annular air exit nozzle at the forward ends of the intermediate and outer tubes. Also, this embodiment features a cooled handle.

One significant aspect and feature of the present invention is a hot air welding torch which is safe to the touch at all members prior to the welding tip.

Another significant aspect and feature of the present invention is the incorporation in a hot air welding torch of an inner tube and an outer tube to form an annular cooling chamber about an electrical resistance heater.

Another significant aspect and feature of the present invention is the introduction of pressurized air to an annular cooling chamber provided about an electrical resistance heater of a hot air welding torch for the purpose of which carrying away excess internally generated heat which would normally, such as in the prior art, cause excessive outer tube temperature which creates a potential hazard for the welder operator.

Another significant aspect and feature of the present invention is the provision of a dual path air flow in a hot air welding torch where a first air flow path is utilized central to the torch to provide suitable welding temperatures at the welding tip and where a second air flow path flows through an annular cooling chamber surrounding an electrical resistance heater to carry away internally generated heat which would otherwise be transferred to an outer tube member.

Another significant aspect and feature of the present invention is the provision of a hot air welding torch with an insulative glass filled nylon handle which is distanced from the electrical resistance heater and which also has minimal contact with heat transferring members internal to the torch.

Another significant aspect and feature of the present invention, included in an alternative embodiment of a hot air welding torch designed for very high temperature welding, is an air cooled glass filled nylon insulative handle.

Having thus described embodiments and significant aspects and features of the present invention, it is the principal object of the present invention to provide a hot air welding torch which is safer to use than known hot air welding torches.

Another object of the present invention is to reduce the potential for an operator or user of a hot air welding torch to be burned by coming into contact with exposed parts of the torch.

A further object of the present invention is to provide a hot air torch for welding plastic which during use is safe to touch at al portions except for the welding tip.

An additional object of the present invention is to provide a hot air torch for welding of plastic with an efficient cooling system for keeping all exposed parts other than the welding tip from becoming excessively hot.

Still another object of the present invention is to provide a single handle design which can be used with hot air welding torches of different welding capacities.

Yet another object of the present invention is to provide a cooled handle for a hot air welding torch where very high temperatures are required for welding.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
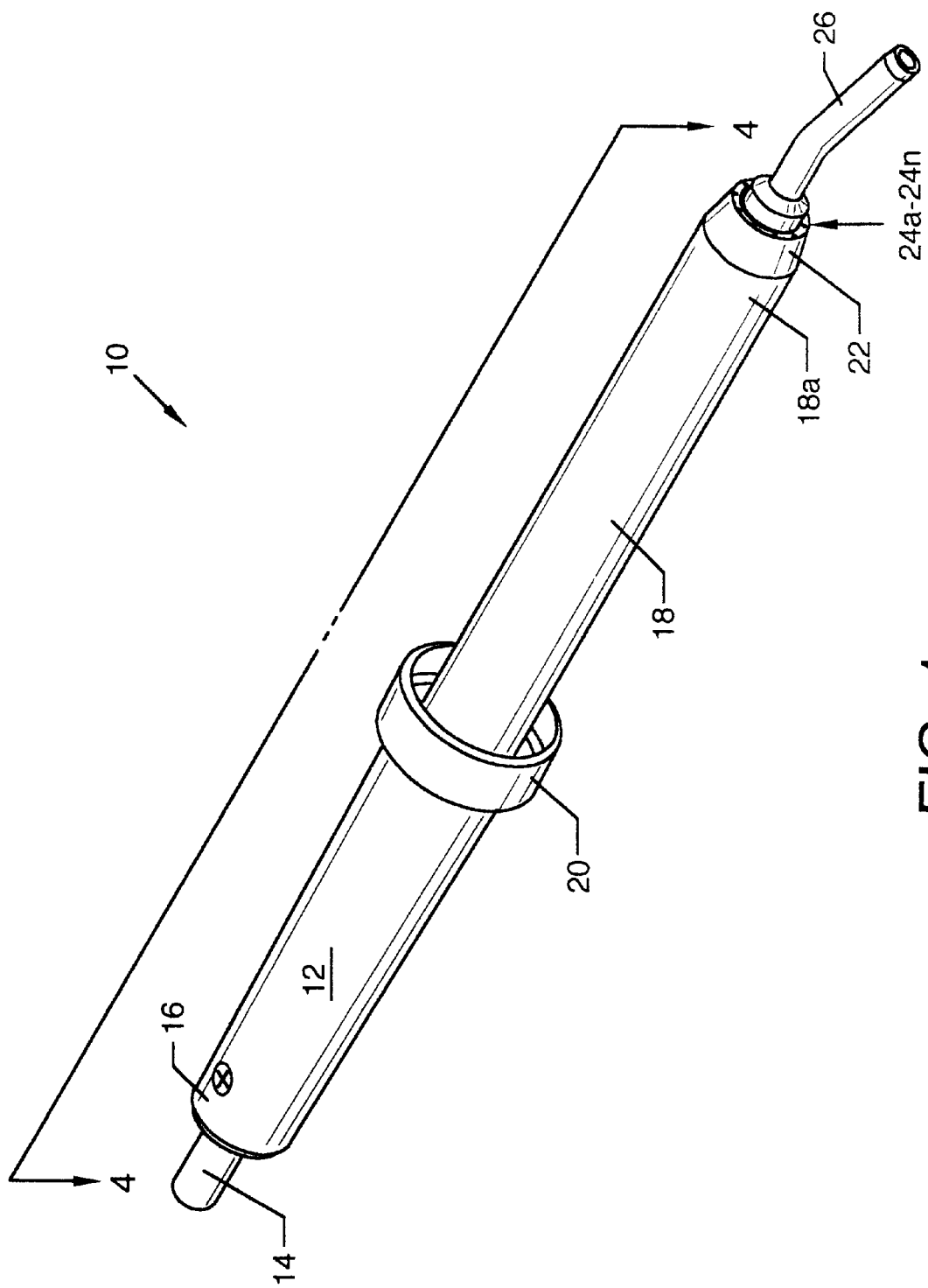
FIG. 1 illustrates an isometric view of a hot air torch for welding of plastic.

FIG. 1 illustrates an isometric view of a hot air torch for welding of plastic, the present invention, herein called the torch 10. Externally visible components of the hot air torch 10 include a glass filled nylon handle, herein called the handle 12, an air introduction tube 14 at the rearward end 16 of the handle 12, an outer tube 18 aligned in the handle 12 and extending outwardly from the handle forward end 20, a nozzle assembly 22 secured to and extending from one end of the outer tube 18, a plurality of air exit nozzles 24a–24n aligned to one end of the nozzle assembly 22, and a welding tip 26 threadingly engaging the nozzle assembly 22.

Figure 2:
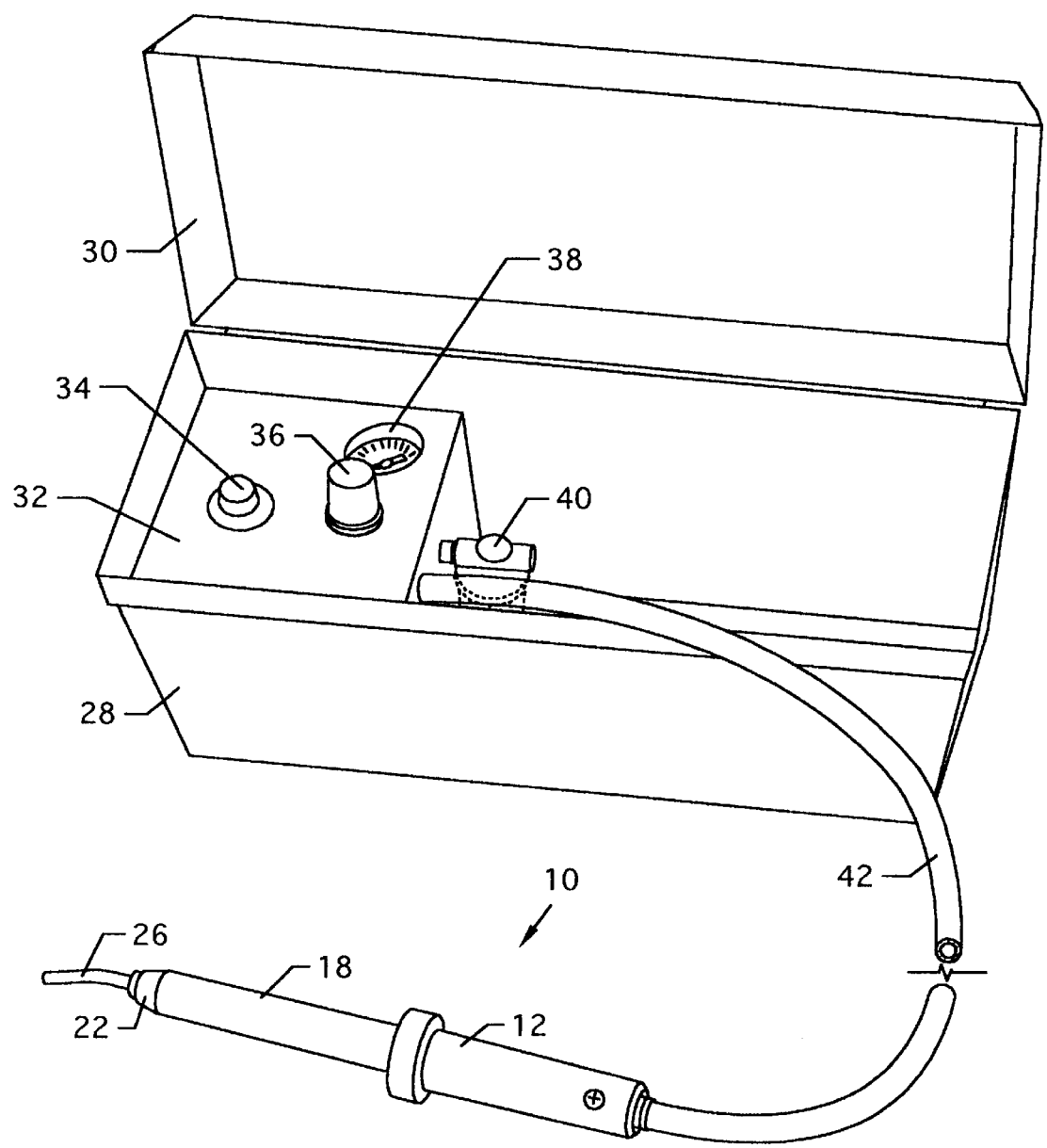
FIG. 2 illustrates a view of the hot air torch and support equipment which can be incorporated into use for operation of the hot air torch.

FIG. 2 illustrates a view of the torch 10 and support equipment which can be incorporated into use for operation of the torch 10, where all numerals which have appeared before correspond to those elements previously described. A rectangular case 28 having a hinged lid 30 provides a housing for the support components which include an internally located instrument and control panel 32, an enclosure having an electrical power control 34 for varying and regulating the amount of inputed heat to the torch 10, an air regulator control 36 for pressure control of compressed air or gas to the torch 10, an air pressure gauge 38, an air filter 40, and a flexible plastic air tube 42 connecting to the torch 10.

Figure 3:
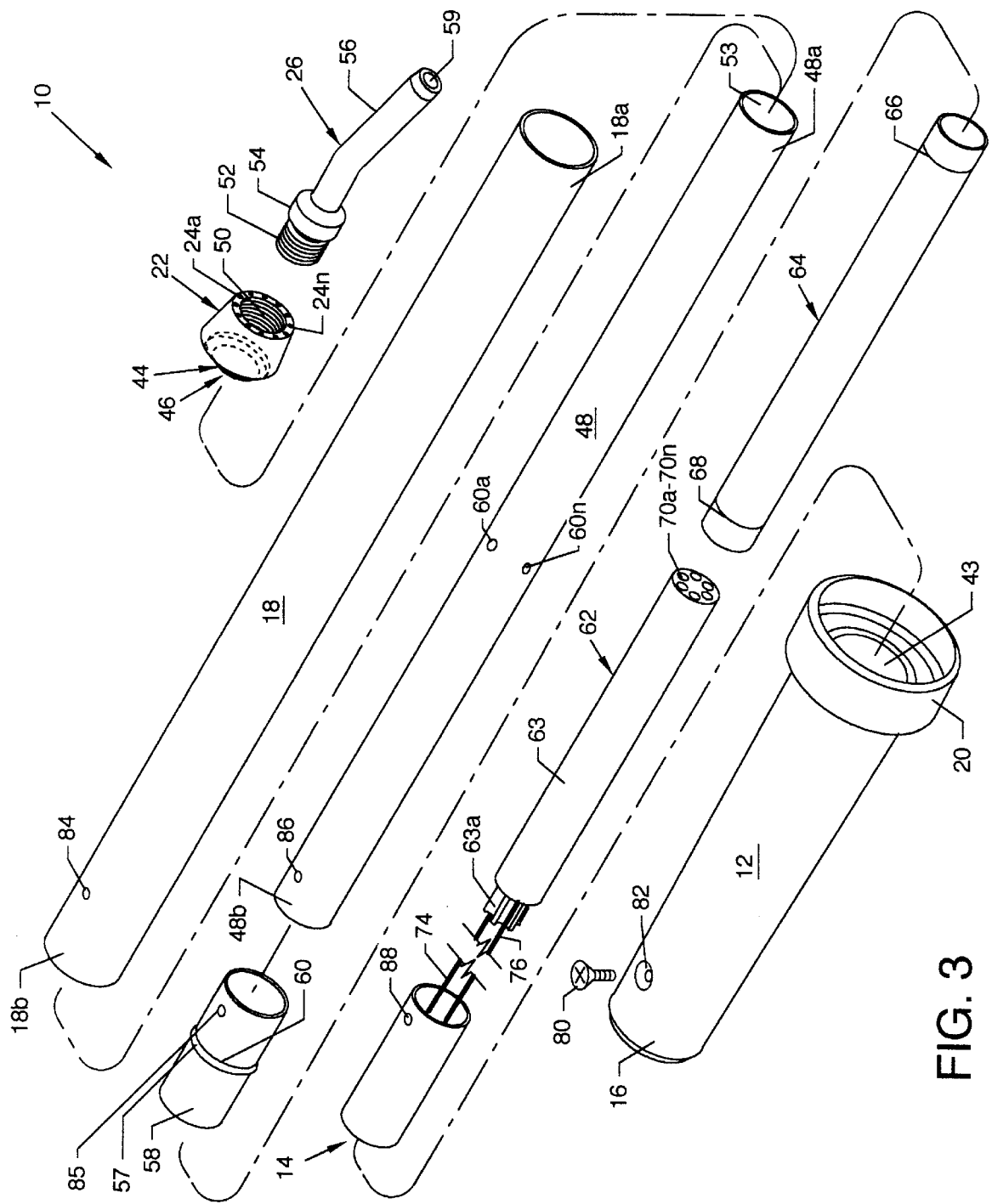
FIG. 3 illustrates an exploded isometric view of the hot air torch of FIG. 1.
Figure 4:
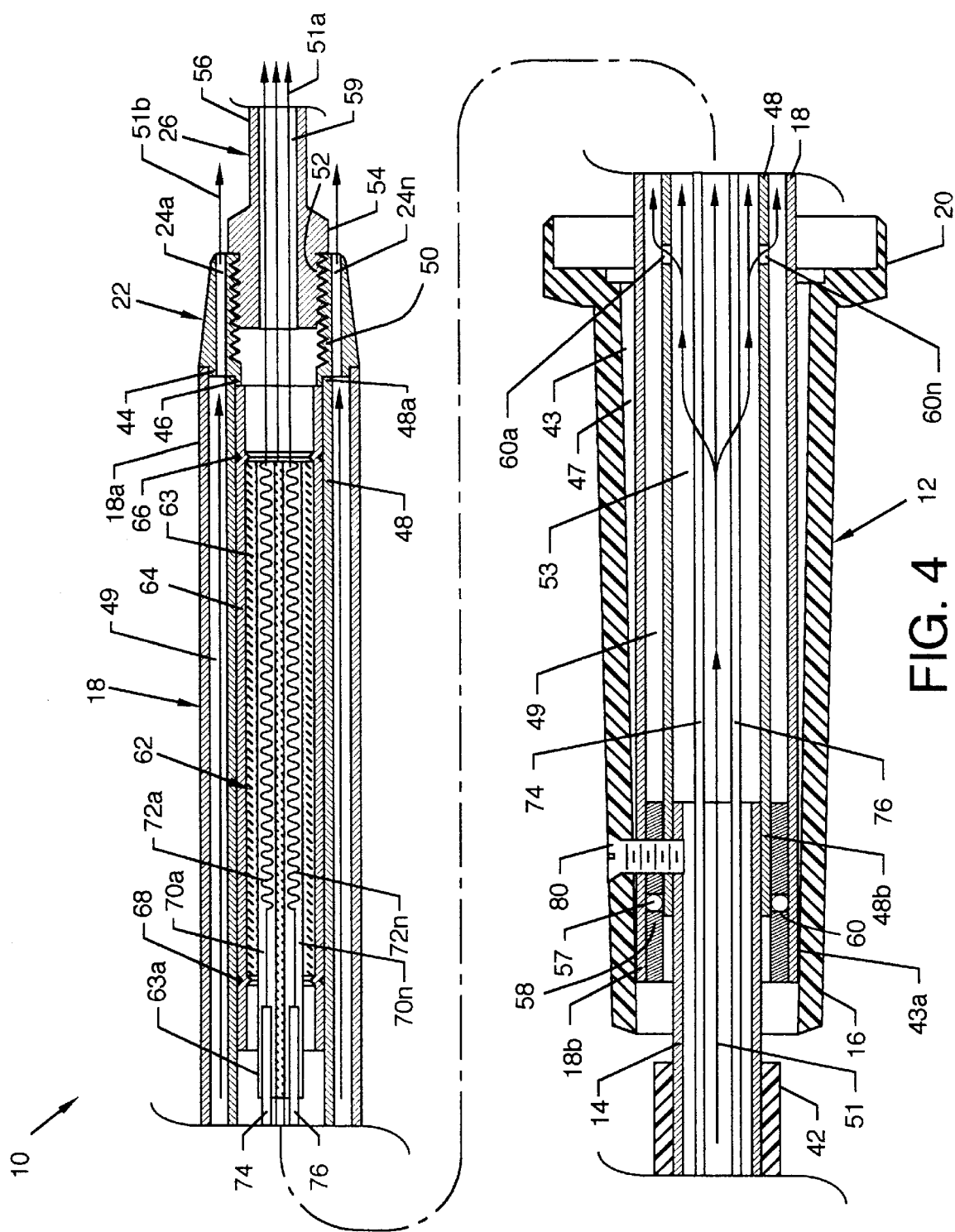
FIG. 4 illustrates a cross sectional view of the assembled hot air torch along line 4—4 of FIG. 1.

FIG. 3 illustrates an exploded isometric view of the torch 10 and FIG. 4 illustrates a cross sectional view of the assembled torch 10 along line 4—4 of FIG. 1 where all numerals which have appeared before correspond to those elements previously described. Reference is now made to the torch 10 referring to FIGS. 3 and 4. The majority of the components of the torch 10 align concentrically within or align to the outer tube 18 and collectively secure into a tapered bore 43 central to the handle 12. The taper of the tapered bore 43 of the handle 12 is quite shallow and includes a close fit end bore portion 43a which serves to promote alignment of and to closely accommodate the rearward end 18b of the outer tube 18 in frictional engagement. The handle 12 is in minimal contact with the rearward end 18b of the outer tube 18, thus being connectively distanced from the region of outer tube 18 which is parallel to an electrical resistance heater 62, to minimize heat transfer from the outer tube 18 to the handle 12. The handle 12 is also distanced from the outer tube 18 by an air space 47 between the tapered bore 43 and the outer tube 18 to provide air insulation. The air space 47 is open in a forward direction to allow heat to vent forwardly to maintain handle coolness. A rearward portion of an annular cooling chamber 49, later described, forms an air insulation barrier between an inner tube 48 and the handle 12. Near the most forward portion of the torch 10, the nozzle assembly 22 is welded to the forward end 48a of the inner tube 48. The rear of the nozzle assembly 22 includes an outer annular shoulder 44 for alignment of the forward end 18a of the outer tube 18 and an inner annular shoulder 46 for alignment and welded accommodation of the forward end 48a of the inner tube 48. The nozzle assembly 22 includes an inner threaded surface 50 aligned to the central axis of the nozzle assembly 22, and also includes a plurality of air exit nozzles 24a–24n aligned parallel to and about the axis of the nozzle assembly 22. The welding tip 26 includes an outer threaded surface 52, which mates to the inner threaded surface 50 of the nozzle assembly 22, an annular outer surface 54 adjacent to the outer threaded surface 52, an angled tube structure 56 adjacent to the annular outer surface 54, and a central hot air passage 59. The central hot air passage 59 extends the entire length of the welding tip 26 and communicates with the inner tube 48 and other members therein. Various and sundry tube structures comprising a welding tip may be utilized in the invention and shall not be deemed to be limiting to the scope of the invention. An inner tube 48 is aligned central to the outer tube 18. A short tube 58 having an O-ring 57 in a groove 60 aligns over and about the rearward end 48b of the inner tube 48 for spacing the rearward end 18b of outer tube 18 from the inner tube 48 at the interior of the rearward end 18b of the outer tube 18. A hole 85 is also included in the short tube 58. Spacing of the forward end 48a of the inner tube 48 from the outer tube 18 is maintained by welding of the forward end 48a to the inner annular shoulder 46 and the forward end 18a to the outer annular shoulder 44 on the nozzle assembly 22. An annular cooling chamber 49 is formed between the outer tube 18 and the inner tube 48 and is utilized for passage of air 51 for the purpose of cooling, as later described in detail. The annular chamber 49 communicates, at the end nearest the nozzle assembly 22, with the plurality of air exit nozzles 24a–24n, and, at the mid-portion of the inner tube 48, with a lumen 53 interior to the inner tube 48 via a plurality of air passage holes 60a–60n extending through the wall of the inner tube 48 for passage of air 51, as later described in detail. An electrical resistance heater 62 aligns to the interior of a tubular metal electrical resistance heater housing 64 and these parts 62 and 64 together as a unit align within the lumen 53 of the inner tube 48 at a location nearest the inner tube forward end 48a and forward of the plurality of air passage holes 60a–60n. Annular deformations 66 and 68 at opposing ends of the tubular metal electrical resistance heater housing 64 secure the electrical resistance heater 62 between the ends of the tubular metal electrical resistance heater housing 64. The electrical resistance heater 62 features a ceramic body 63 having a plurality of horizontally aligned air passages 70a–70n which align parallel and in equal spacing to the longitudinal axis of the ceramic body 63. A plurality of electrical resistance elements 72a–72n align in and along the plurality of horizontally aligned air passages 70a–70n, respectively The ceramic body 63 extends rearwardly to form an integral electrical insulator fixture 63a for orderly securing and alignment of electrical wires 74 and 76 which connect to the plurality of electrical resistance elements 72a–72n. One end of the air introduction tube 14 aligns with the rearward end 48b of the inner tube 48, and a flexible plastic air tube 42 secures appropriately to the remaining end of the air introduction tube 14. Wires 74 and 76 and pressurized supply air 51 are routed from the instrument and control panel 32 through the interior of the flexible plastic air tube 42 and are introduced into the interior of the torch 10 by the air introduction tube 14. A machine screw 80 secures through holes 82, 84, 85, 86 and into hole 88 located, respectively, in the handle 12, the outer tube 18, the inner tube 48 and the air introduction tube 14 to mutually secure the tubular and other respective components Securing the machine screw 80, as just described, urges the outer tube forward end 18a into firm contact and engagement with the outer annular shoulder 44 of the nozzle assembly 22 to ensure spacing of the outer tube forward end 18a with respect to the inner tube 48, thereby maintaining the annular cooling chamber 49.

Figure 5:
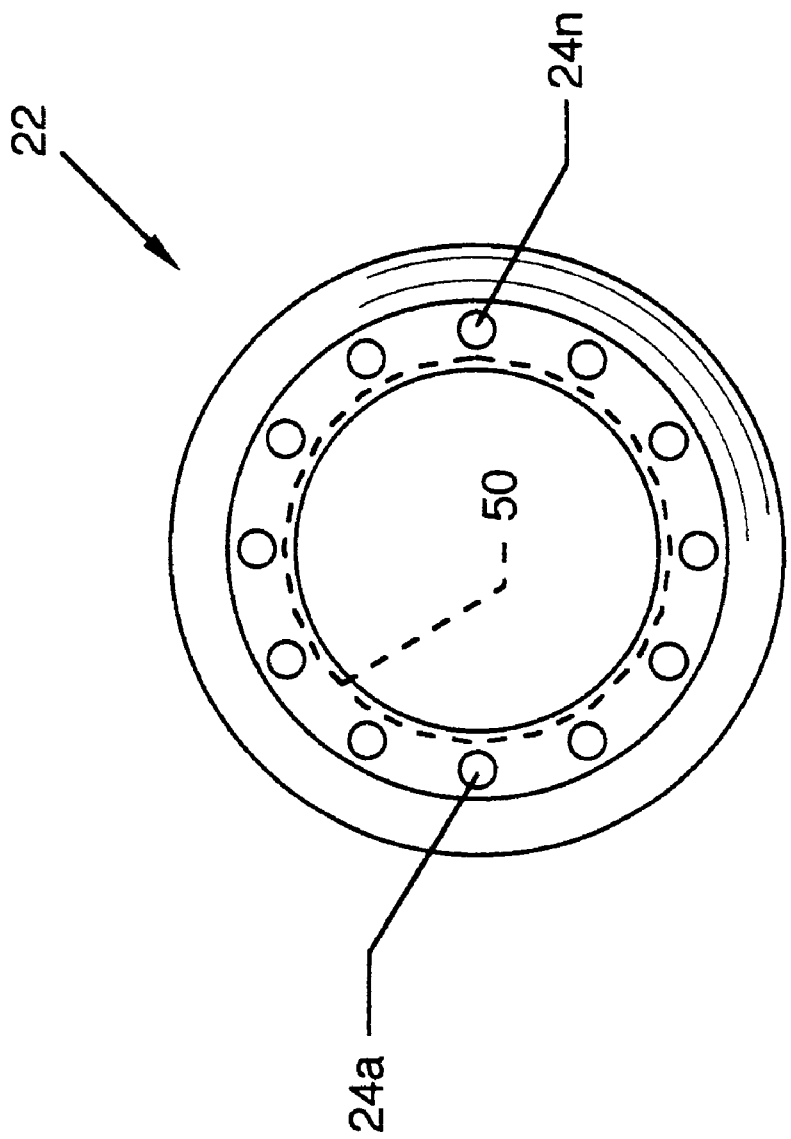
FIG. 5 illustrates a front view of the nozzle assembly.

FIG. 5 illustrates a front view of the nozzle assembly 22, where all numerals correspond to those elements previously described. Illustrated in particular is the plurality of air exit nozzles 24a–24n at the forward edge of the nozzle assembly 22.

Figure 6:
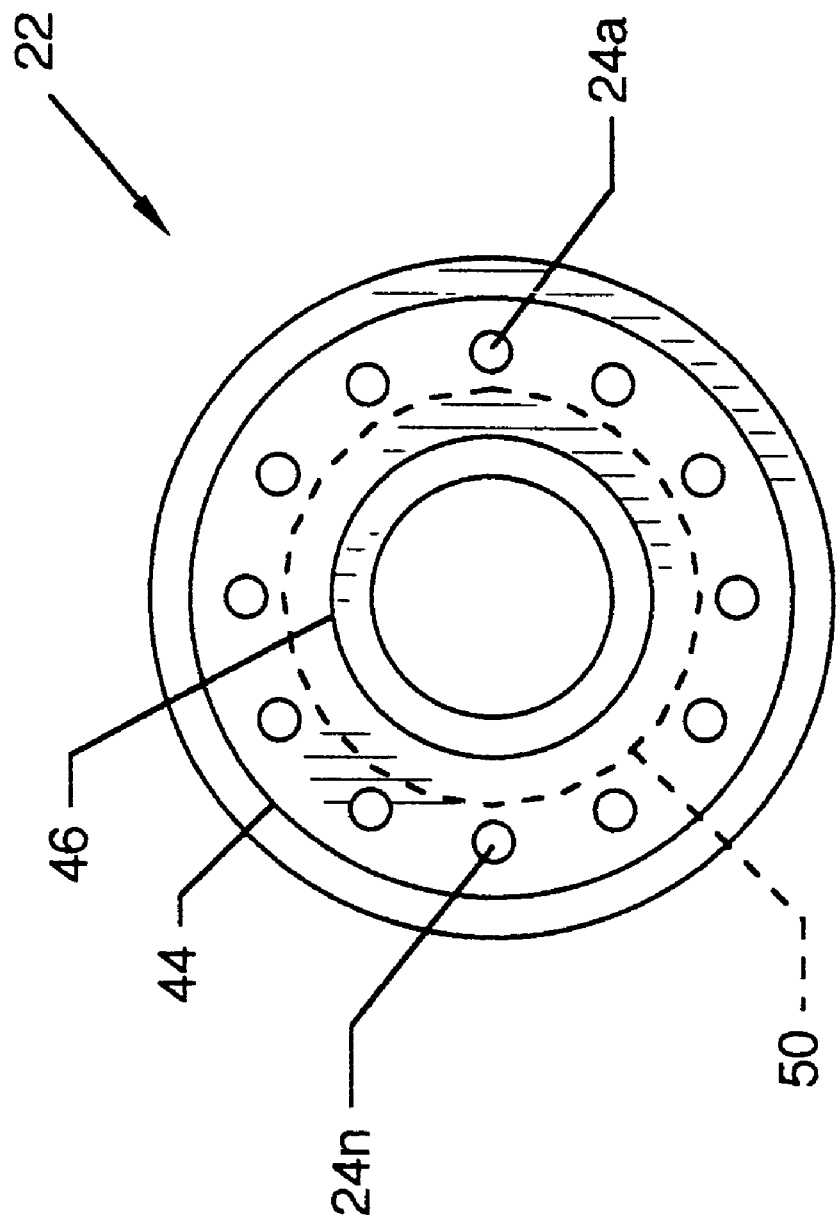
FIG. 6 illustrates a rear view of the nozzle assembly.

FIG. 6 illustrates a rear view of the nozzle assembly 22, where all numerals correspond to those elements previously described. Illustrated in particular are the inner annular shoulder 46 and the outer annular shoulder 44 which accommodate the forward end 48a of the inner tube 48 and the forward end 18a of the outer tube 18, respectively.

MODE OF OPERATION

A source of electrical power is supplied to the instrument and control panel 32 and a pressurized air source is connected to the air filter 40. Electrical power is controlled by the electrical power control 34 and is delivered to the electrical resistance heater 62 to provide various required levels of heat for welding of plastic or other such suited materials Pressurized air 51 or other such suitable gas such as nitrogen is regulated by the air regulator control 36 and monitored by the air pressure gauge 38. Pressurized air is supplied by the flexible plastic air tube 42 and delivered to the air introduction tube 14. The pressurized air 51 passes under pressure into the lumen 53 of the inner tube 48 and then flows along different paths. One flow path is forwardly along the lumen 53 where the air 51 passes through the plurality of air passages 70a–70n in the ceramic body 63 of the electrical resistance heater 62 and is heated by the plurality of electrical resistance elements 72a–72n and emerges as hot air 51a. The hot air 51a then passes directly through the hot air passage 59 in the welding tip 26 where the hot air 51a is directed towards plastic members which are to be welded. The other flow path is from the lumen 53 through the plurality of air passage holes 60a–60n and into the annular cooling chamber 49 where the pressurized air 51 flows forwardly and entrains heat radiated by the inner tube 48 and transports the ever warming air 51, which progressively accumulates heat from the inner tube 48, to the plurality of air exit nozzles 24a–24n in the nozzle assembly 22 to emerge as warmed air 51b, thereby preventing transfer of heat to the outer tube 18 so as to provide an outer tube 18 which is safe to the touch.

ALTERNATIVE EMBODIMENT

Figure 7:
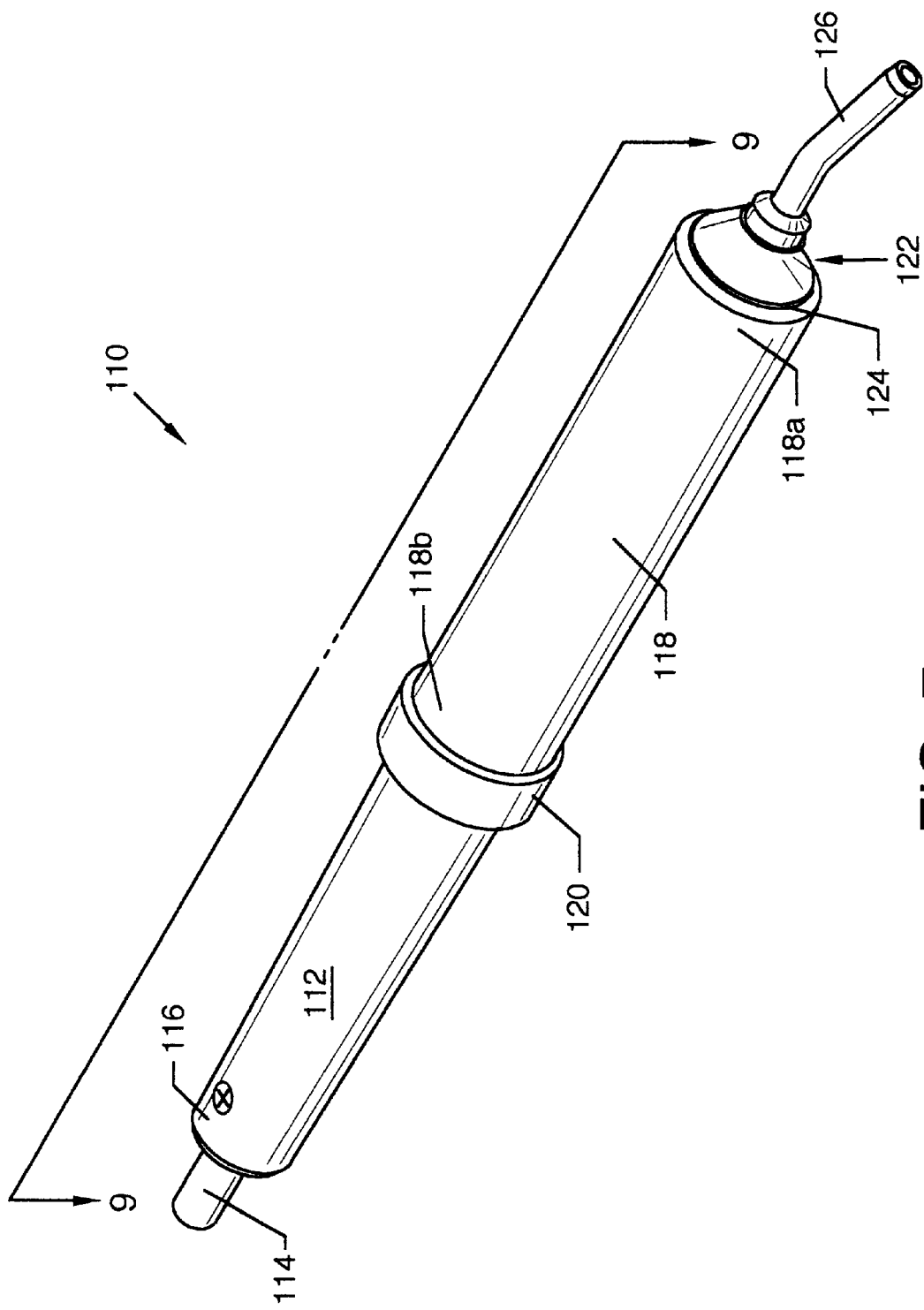
FIG. 7, an alternate embodiments illustrates an isometric view of a hot air torch for high temperature welding of plastic.

FIG. 7, an alternate embodiments illustrates an isometric view of a hot air torch, herein called the torch 110, for high temperature welding of plastic, such as ultra high molecular weight (UHSW) plastics. Externally visible components of the torch 110 include a glass filled nylon handle, herein called the handle 112, an air introduction tube 114 at the rearward end 116 of the handle 112, an outer tube 118 the rearward end 118b of which aligns in the forward end 120 of the handle 112 and extends outwardly from the handle forward end 120, a nozzle assembly 122 aligned to and extending from the forward end 118a of the outer tube 118, an annular air exit nozzle 124 between the forward end 118a of the outer tube 118 and the nozzle assembly 122, and a welding tip 126 threadingly engaging the nozzle assembly 122. In general, the principle of operation is somewhat similar to that described for the torch 10; however, because additional heat is generated for high temperature welding, additional cooling is provided for by including an outer annular cooling chamber larger than the annular cooling chamber 49 of the torch 10 which communicates with an open air exit nozzle 124 which is annular and has an area larger than the combined areas of the plurality of air exit nozzles 24a–24n of the torch 10.

Figure 8:
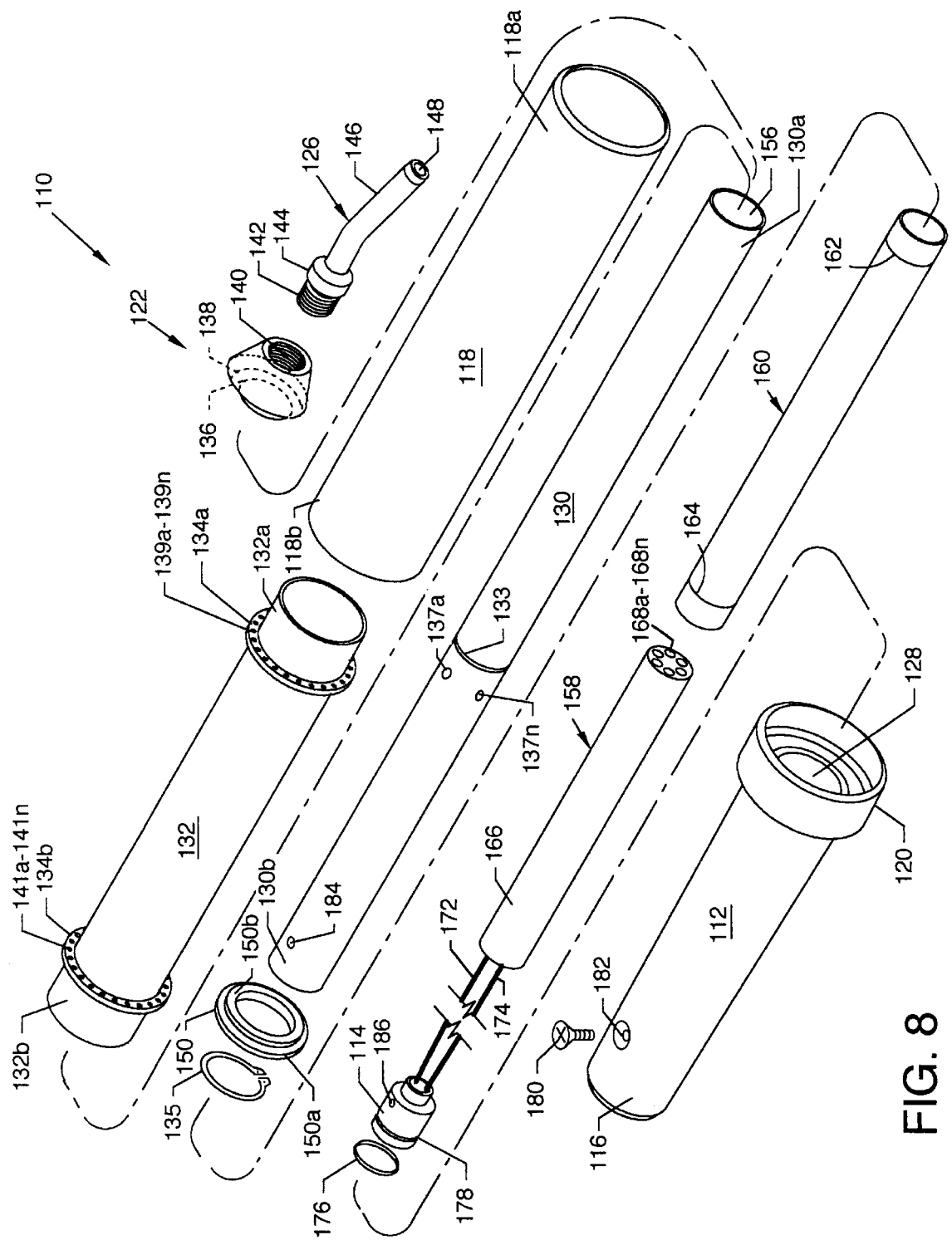
FIG. 8 illustrates an exploded isometric view of the hot air torch of FIG. 7; and, FIG. 9 illustrates a cross sectional view of the assembled hot air torch along line 9—9 of FIG. 7
Figure 9:
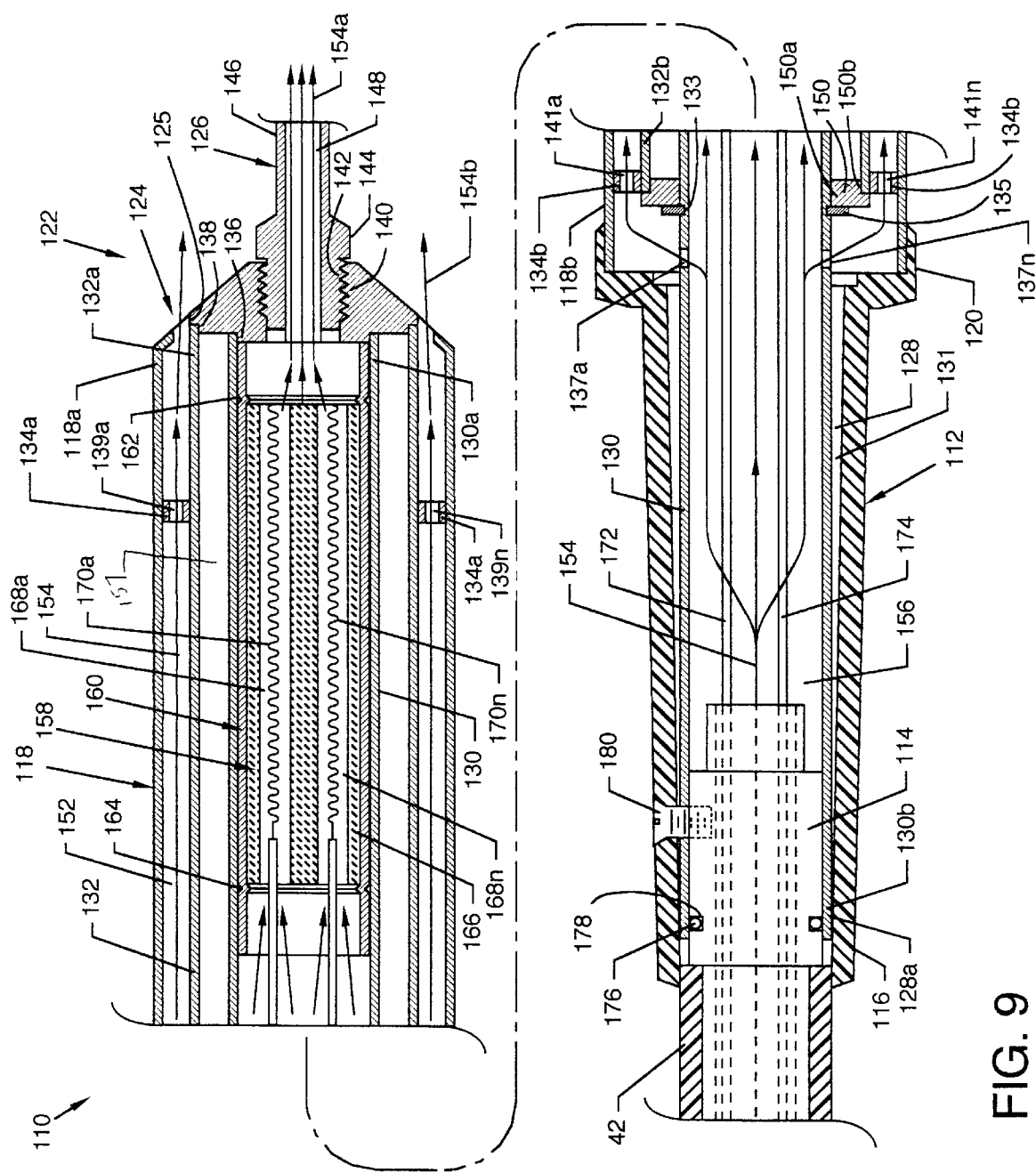

FIG. 8 illustrates an exploded isometric view of the torch 110 and FIG. 9 illustrates a cross sectional view of the assembled torch 110 along line 9—9 of FIG. 7, where all numerals which have appeared before correspond to those elements previously described. Reference is now made to the torch 110 illustrated in FIGS. 8 and 9. The majority of the components of the torch 110 align concentrically about or align to inner tube 130 and collectively and mutually secure into a tapered bore 128 central to the handle 112. The taper of the tapered bore 128 of the handle 112 is quite shallow and includes a close fit end bore portion 128a which serves to promote alignment of and to closely accommodate the rearward end 130b of the inner tube 130 in frictional engagement. The handle 112 is in minimal contact with the rearward end 130b of the inner tube 130, thus being connectively distanced from the region of inner tube 130 which is parallel to an electrical resistance heater 158, to minimize heat transfer from the inner tube 130 to the handle 112. The handle 112 is also distanced from the inner tube 130 by the air space 131 between the tapered bore 128 and the inner tube 130 to provide air insulation. Pressurized air 154 flows forwardly along lumen 156 of inner tube 130 to absorb and carry away heat transmitted to the rearward end 130b of the inner tube 130, thus providing for a cooled handle 112. The inner tube 130 also includes a forward end 130a, a groove 133 for accommodation of a snap ring 135, and a plurality of air passage holes 137a–137n to the rearward of the groove 133. An intermediate tube 132 aligns between the inner tube 130 and the outer tube 118 and includes a forward end 132a, a rearward end 132b, a forward combination spacer and air passage ring 134a secured over and about and near the forward end 132a, and a rearward combination spacer and air passage ring 134b secured over and about and near the rearward end 132b. The forward combination spacer and air passage ring 134a includes a plurality of air passages 139a–139n, and the rearward combination spacer and air passage ring 134b includes a plurality of air passages 141a–141n. The intermediate tube 132 and the forward and rearward combination spacer and air passage rings 134a and 134b align within the interior of the outer tube 118. The forward end 132a of the intermediate tube 132, being fixedly and rigidly spaced from the outer tube 118, provides for concentric alignment and support of the nozzle assembly 122 (and inner tube forward end 130a) to maintain an evenly spaced annular air exit nozzle 124 formed between the forward end 118a of the outer tube 118 and the outermost annular periphery 125 of the nozzle assembly 122. Near the most forward portion of the torch 110, the nozzle assembly 122 is welded to the forward end 130a of the inner tube 130. The rear of the nozzle assembly 122 includes an inner annular shoulder 136 for alignment and welded accommodation of the forward end 130a of the inner tube 130, and, an outer annular shoulder 138 for alignment and accommodation of the forward end 132a of the intermediate tube 132. The nozzle assembly 122 also includes an inner threaded surface 140 aligned to the central axis of the nozzle assembly 122. The welding tip 126 includes an outer threaded surface 142, which mates to the inner threaded surface 140 of the nozzle assembly 122, an annular outer surface 144 adjacent to the outer threaded surface 142, an angled tube structure 146 adjacent to the annular outer surface 144, and a central hot air passage 148. The central hot air passage 148 extends the entire length of the welding tip 126 and communicates with the inner tube 130 and other members therein. Various and sundry tube structures comprising a welding tip may be utilized in the invention and shall not be deemed to be limiting to the scope of the invention. The inner tube 130, which aligns central to the intermediate tube 132, also includes a multiradius spacing ring 150 aligned over and about the inner tube 130 forward of the groove 133 for spacing the central portion of the inner tube 130 from the inner portion of the intermediate tube 132 at the rearward end 132b of the intermediate tube 132. The multiradius spacing ring 150 includes an annular shoulder 150b extending forwardly from the main body 150a. The annular shoulder 150b aligns to the inner wall of the intermediate tube 132 at the intermediate tube rearward end 132b, and the main body 150a abuts the intermediate tube rearward end 132b. The snap ring 135 engages groove 133 to cause the multiradius spacing ring 150 to urge the intermediate tube 132 against the nozzle assembly 122 at the outer annular shoulder 138. Spacing of the forward end 130a of the inner tube 130 is maintained by alignment of the forward end 130a to the inner annular shoulder 136 on the nozzle assembly 122. An annular cooling chamber 152 is formed between the outer tube 118 and the intermediate tube 132 and is utilized for passage of air 154 for the purpose of cooling, as later described in detail. The annular cooling chamber 152 communicates, at the end nearest the nozzle assembly 122, with the annular air exit nozzle 124, and at the mid-portion of the inner tube 130, with the lumen 156 interior to the inner tube 130 via the plurality of air passage holes 137a–137n extending through the wall of the inner tube 130 for passage of air 154, as later described in detail. Air passage in the annular chamber 152 also occurs in a forward direction through the rearward and forward combination spacer and air passage rings 134b and 134a. A dead air space 157, in general, is located between the annular cooling chamber 152 and the lumen 156, and more specifically is bounded by the intermediate tube 132, the inner tube 130, the nozzle assembly 122, and the spacing ring 150. An electrical resistance heater 158 aligns to the interior of a tubular metal electrical resistance heater housing 160 and these parts 158 and 160 together as a unit align within the interior of the inner tube 130 at a location nearest the inner tube forward end 130a and forward of the plurality of air passage holes 137a–137n. Annular deformations 162 and 164 secure the electrical resistance heater 158 between the ends of the tubular metal electrical resistance heater housing 160. The electrical resistance heater 158 features a ceramic body 166 having a plurality of horizontally aligned air passages 168a–168n which align parallel to the longitudinal axis of the ceramic body 166. A plurality of electrical resistance elements 170a–170n align in and along the plurality of horizontally aligned air passages 168a–168n, respectively. Electrical wires 172 and 174, which connect to the plurality of electrical resistance elements 170a–170n, pass through the lumen 156, through the air introduction tube 114 and through the flexible plastic air tube 42. One end of the air introduction tube 114 aligns with the rearward end 130b of the inner tube 130, and the flexible plastic air tube 42 secures appropriately to the remaining end of the air introduction tube 114. An O-ring seal 176 aligns in an annular groove 178 in the air introduction tube 114 and seals against the interior of the inner tube 130 to perfect an airtight seal between the air introduction tube 114 and the inner tube 130. Wires 172 and 174 and pressurized supply air 154 are routed from the instrument and control panel 32 through the interior of the flexible plastic air tube 42 and are introduced into the interior of the torch 110 by the air introduction tube 114. A machine screw 180 secures through holes 182, 184, and into hole 186 located respectively in the handle 112, the inner tube 130 and the air introduction tube 114 to mutually secure the tubular and other respective components.

The mode of operation of the torch 110 closely resembles that described for the torch 10. A source of electrical power is supplied to the instrument and control panel 32 and a pressurized air source is connected to the air filter 40. Electrical power is controlled by the electrical power control 34 and is delivered to the electrical resistance heater 158 to provide various required levels of heat for welding of plastic or other such suited materials. Pressurized air or other such suitable gas such as nitrogen is regulated by the air regulator control 36 and monitored by the air pressure gauge 38. Pressurized air 154 is supplied by the flexible plastic air tube 42 and delivered to the air introduction tube 114. The pressurized air 154 passes under pressure into the lumen 156 of the inner tube 130 and then flows along different paths. One flow path is forwardly along the lumen 156 where the air passes through the plurality of air passages 168a–168n in the ceramic body 166 of the electrical resistance heater 158 and is heated by the plurality of electrical resistance elements 170a–170n and emerges as hot air 154a. The hot air 154a then passes directly through the hot air passage 148 in the welding tip 126 where the hot air 154a is directed towards plastic members which are to be welded. The other flow path is from the lumen 156 through the plurality of air passage holes 137a–137n, through the plurality of air passages 141a–141n in the rearward combination spacer and air passage ring 134b and into the annular cooling chamber 152 where the pressurized air 154 flows forwardly and entrains heat radiated by the intermediate tube 132 and transports the ever warming air 154, which progressively accumulates heat from the intermediate tube 132, along the annular cooling chamber 152 and out through the plurality of air passages 139a–139n in the forward combination spacer and air passage ring 134a to the annular air exit nozzle 124 in the nozzle assembly 122 to emerge as warmed air 154b thereby preventing transfer of heat to the outer tube 118 so as to provide an outer tube 118 which is safe to the touch.

Various modifications can be made to the present invention without departing from the apparent scope hereof.

It is claimed:

1. A hot air welding torch comprising:
   a. an inner tube having an air inlet at a first end, said first end connected to a source of pressurized air, and an air outlet at a second end of said inner tube, said inner tube having a first region adjacent said air inlet and a second region longitudinally spaced from, and adjacent to said first region, an air heating device situated within said second region between said air inlet and said air outlet, said second region of said inner tube defining a heated air passage;
   b. an outer tube having a first end affixed to said first end of said inner tube, generally enclosing and concentrically disposed with respect to said inner tube and spaced apart therefrom to define a cooling chamber, an air inlet to said cooling chamber from said inner tube spaced from said first end and positioned close to the junction of said first and second regions of said inner tube, and an air outlet from said cooling chamber concentrically disposed with respect to said inner tube;
   c. handle means, having a first end affixed to said first ends of said outer and inner tubes, and a second end concentrically disposed with respect to, and spaced apart from said inner and outer tubes, such that the region between said first and second ends of said handle overlap, at least in part, said first region of said inner tube and said outer tube;
   d. handle support means fixed to said first end of said outer tube for holding said handle in a spaced apart
   e. a welding tip connected to said heated air passage at said inner tube air.

2. The hot air welding torch of claim 1, additionally including manifold means for distributing an air flow between the heated air passage and the cooling chamber passage.

3. The hot air welding torch of claim 2, wherein the manifolding means for distributing an air flow between the heated air passage and the cooling chamber passage comprises an air introduction tube coaxially aligned with the inner tube and the outer tube.

4. The hot air welding torch of claim 3, wherein the air introduction tube has a diameter intermediate between the inner tube and the outer tube.

5. The hot air welding torch of claim 3, wherein the air introduction tube further includes a short tube of diameter intermediate between the air introduction tube and the outer tube and wherein the short tube spaces the outer tube from the air introduction tube in a coaxial arrangement.

6. The hot air welding torch of claim 1, wherein the heating device is an electrical resistance heater.

7. The hot air welding torch of claim 6, wherein the electrical resistance heater has a generally cylindrical ceramic body.

8. The hot air welding torch of claim 7, wherein the ceramic body has a plurality of air passages lying parallel to, spaced apart from, and generally radially distributed about the axis of the ceramic body.

9. The hot air welding torch of claim 6, wherein the electrical resistance heater further includes wires and the wires pass through the manifold means.

10. The hot air welding torch of claim 1, wherein the space between said handle and said outer tube is progressively increased.

11. The hot air welding torch of claim 10, wherein the handle is a glass filled nylon material.

12. The hot air welding torch of claim 1, wherein the welding tip is attached to a nozzle assembly providing communication with the air outlet of the heated air passage.

13. The hot air welding torch of claim 12, wherein the welding tip is attached to the nozzle assembly by means of a threaded connection.

14. The hot air welding torch of claim 13, wherein the threaded connection includes an inner threaded surface on the nozzle assembly and an outer threaded surface on the welding tip.

15. The hot air welding torch of claim 12, wherein the welding tip is removable from the nozzle assembly.

16. The hot air welding torch of claim 12, further including air exit nozzle passages in communication with the air outlet from said cooling chamber whereby the nozzle assembly is cooled by air from said air exit nozzle passages.

17. The hot air welding torch of claim 16, wherein the air exit nozzle passages are radially spaced apart from and parallel to the axis of the outer tube.

18. A hot air welding torch suitable for welding ultra high molecular plastic comprising:
   a. a handle having a rearward end and a forward end, a region between said rearward and forward ends overlapping an inner tube;
   b. an axially positioned air introduction tube carried by the handle and having a rearward end protruding from the rearward end of the handle;
   c. an inner tube for passage of air, the inner tube having a rearward end and a forward end, the rearward end in communication with the air introduction tube;
   d. a nozzle assembly having a plurality of air exit nozzles and a welding tip affixed thereto, the nozzle assembly in communication with the forward end of the inner tube;
   e. an electrical resistance heater and housing within the inner tube adjacent the forward end of the inner tube;
   f. an outer tube in coaxial, spaced apart relationship with the inner tube, and forming a cooling chamber passage between the inner tube and the outer tube, the cooling chamber passage having an inlet at the rearward end and an outlet at the forward end thereof; and,
   g. wherein the outlet of the cooling chamber includes plural air passage holes in the nozzle assembly adjacent the welding tip.

19. A hot air welding torch suitable for welding ultra high molecular plastic comprising:
   a. a handle having a rearward end and a forward end, a region between said rearward and forward ends overlapping an inner tube;
   b. an axially positioned air introduction tube carried by the handle and having a rearward end protruding from the rearward end of the handle;
   c. an inner tube for passage of air, the inner tube having a rearward end and a forward end, the rearward end in communication with the air introduction tube;
   d. a nozzle assembly having a plurality of air exit nozzles and a welding tip affixed thereto, the nozzle assembly in communication with the forward end of the inner tube;
   e. an electrical resistance heater and housing within the inner tube adjacent the forward end of the inner tube;

f. an intermediate tube coaxially aligned with the inner tube;

g. a pair of combination spacer-air passage rings located on the intermediate tube in a spaced apart arrangement, with one of the pair located forward and one of the pair located rearward;

h. an outer tube in coaxial, spaced apart relationship with the intermediate tube and the pair of combination spacer-air passage rings, and forming a cooling chamber passage between the intermediate tube and the outer tube, the cooling chamber passage having an inlet at the rearward end and an outlet at the forward end thereof; and, g. wherein the outlet of the cooling chamber includes plural air passage holes in the nozzle assembly adjacent the welding tip.

* * * * *